Patented May 10, 1932

1,858,108

UNITED STATES PATENT OFFICE

OSKAR NEUBERT, OF ELBERFELD, NEAR COLOGNE-ON-THE-RHINE, GERMANY, ASSIGNOR TO WINTHROP CHEMICAL COMPANY, INC., OF NEW YORK, N. Y.

MEDICINAL BOUGIE, BALL, AND THE LIKE AND METHOD OF MAKING SAME

No Drawing. Application filed February 4, 1927, Serial No. 166,011, and in Germany March 20, 1926.

Medicinal bougies, balls, and the like heretofore have been prepared according to widely varying principles, the particular mode of preparation generally being regulated by the intended usage. Thus, for example, such bougies or the like have been prepared in which the desired effective remedial substance has been incorporated in or applied about a ground mass consisting of cocoa-butter, glycerin-gelatine, dextrin, sucrose, starch or glycerin. These medicinal bougies usually are made by subjecting to pressure in suitable molds a mixture containing the remedial substance and a ground mass comprising starch.

The known medicinal bougies have shown various disadvantageous characteristics. For instance, those having a cocoa-butter base have been found to melt too readily; those having a glycerin-gelatin base are flexible and do not possess sufficient resistance.

The present invention is based upon my discovery of the fact that medicinal bougies and the like which overcome the defects above-mentioned may be prepared by intimately mixing predetermined amounts of the desired effective remedial substance, extract of licorice and one or more of the known hydrotropical substances (e. g., p-toluene-sodium-sulfonate, sodium sulfanilate, or the like), with or without the further addition of inert materials easily soluble in water (e. g., borax, lactose or the like), kneading the resulting mixture with a mixture comprising gum tragacanth and water, and suitably forming (i. e., molding or pressing) the resulting elastic mass into objects having the shapes and sizes desired. If so desired, the said objects may be enveloped in an outer covering of a suitable inert material, as, for example, an outer lamina of agar-agar. Medicinal bougies, balls, or the like, so prepared, are found to melt at the desired temperature, to disolve readily and completely in body secretions and in water, to have sufficient flexibility or elasticity without loss of strength, and to be particularly adapted for those uses to which medicinal bougies, balls and the like are generally put. Bacteriological experiments have shown that the effective remedial ingredient present in such compositions prepared as above described is easily taken up by the outer covering (as, for example, an enveloping lamina of agar-agar) enveloping the object.

In order to illustrate the invention more fully the following example is given, the parts being by weight:

100 parts of the protein silver compound prepared in accordance with the example given in United States Letters Patent No. 615,970 are intimately mixed with 430 parts of the sodium salt of p-toluene-sulfonic acid, 284 parts of borax and 16 parts of extract of licorice, and the resulting mixture is kneaded into a plastic mass with a mixture consisting of 120 parts of gum tragacanth and 50 parts of water. The plastic mass thus obtained is formed into bougies of predetermined length and thickness by means of a suitable press. The so-formed bougies may or may not subsequently receive a coating of an inert substance such as agar-agar.

It is to be understood that the invention comprehends the preparation, in the manner herein set out, of medicinal bougies, balls and the like from compositions or mixtures having as their effective remedial ingredient other substances than that described in the foregoing example.

By the use of the expression "hydrotropical substance" I mean to identify that class of chemical substances described and so named by C. Neuberg; see Sitzungsber. d. Kgl. Pr. Akad. d. Wissenschaften, 1916, pages 1034–42; Biochemische Zeitschrift 1916, Vol. 76, pages 107 et seq. As reported in the Jour. Chem. Soc. (London), Abstracts 1916, Vol. 90, Part II, page 555, the pertinent portion of the latter reference, and the definition of "hydrotropical substances" is as follows:

"Aqueous solutions of certain salts possess the power of dissolving certain substances which are not soluble in pure water. This phenomenon is designated hydrotropism. The salts of benzoic and salicylic acids, benzenesulphonic acid and many of its derivatives, naphthoic and various hydroaromatic acids, possesss this property. The hydrotropic properties can be exerted on carbohydrates, alcohols, aldehydes, and many other classes of simpler compounds, as well as on alkaloids, proteins, fats, and lipoids. Many examples of the phenomenon are given in the paper."

I claim:

1. Process for the manufacture of medicinal bougies, balls and the like involving incorporating an effective remedial substance in a ground mass and forming the resulting mixture into objects of predetermined shapes and sizes, characterized in that the effective remedial substance is incorporated in a ground mass comprising extract of licorice and a water-soluble aromatic hydrotropical substance, and the resulting mixture is kneaded with a mixture comprising gum tragacanth and water.

2. Process for the manufacture of medicinal bougies, balls and the like involving incorporating an effective remedial substance in a ground mass and forming the resulting mixture into objects of predetermined shapes and sizes, characterized in that the effective remedial substance is incorporated in a ground mass comprising extract of licorice and a water-soluble aromatic hydrotropical substance and an inert substance soluble in water, and the resulting mixture is kneaded with a mixture comprising gum tragacanth and water.

3. Process for the manufacture of medicinal bougies, balls and the like which comprises mixing predetermined amounts of an effective remedial substance, extract of licorice and a water-soluble aromatic hydrotropical substance, kneading the resulting mixture with gum tragacanth and water to the formation of a plastic mass, and forming the plastic mass into objects of predetermined shapes and sizes.

4. Process for the manufacture of medicinal bougies, balls and the like which comprises mixing predetermined amounts of an effective remedial substance, extract of licorice and a water-soluble hydrotropical substance of the group consisting of para-toluene-sodium-sulfonate and sodium sulfanilate, kneading the resulting mixture with gum tragacanth and water to the formation of a plastic mass and forming the plastic mass into objects of predetermined shapes and sizes.

5. Process for the manufacture of medicinal bougies, balls and the like which comprises mixing predetermined amounts of an effective remedial substance, extract of licorice, a hydrotropical substance of the group consisting of para-toluene-sodium-sulfonate and sodium sulfanilate and an inert water-soluble material, kneading the resulting mixture with gum tragacanth and water to the formation of a plastic mass, and forming the plastic mass into objects of predetermined shapes and sizes.

6. Process for the manufacture of medicinal bougies, balls and the like which comprises mixing a protein silver compound, the sodium salt of para-toluene sulfonic acid, borax and extract of licorice, kneading the said mixture with a mixture of gum tragacanth and water, and forming the resulting plastic mass into objects of predetermined shapes and sizes.

7. Process for the manufacture of medicinal bougies, balls and the like which comprises mixing 100 parts by weight of a protein silver compound, 430 parts by weight of the sodium salt of p-toluene sulfonic acid, 284 parts by weight of borax and 16 parts by weight of extract of licorice, kneading the said mixture with a mixture comprising 120 parts by weight of gum tragacanth and 50 parts by weight of water, and forming the resulting plastic mass into objects of predetermined shapes and sizes.

8. As new articles of manufacture plastic medicinal objects comprising an effective remedial substance, a ground mass consisting of extract of licorice, an aromatic hydrotropical substance, water and gum tragacanth, said mixture being capable of being formed into objects of predetermined shapes and sizes.

9. As new articles of manufacture plastic medicinal objects comprising an effective remedial substance, extract of licorice, an aromatic hydrotropical substance, an inert material easily soluble in water, water and gum tragacanth, said mixtures being capable of being formed into objects of predetermined shapes and sizes.

10. As new articles of manufacture plastic medicinal objects comprising an effective remedial substance, extract of licorice, a hydrotropical substance of the group consisting of para-toluene-sodium-sulfonate and sodium-sulfanilate, an inert material easily soluble in water, water and gum tragacanth, said mixtures being capable of being formed into objects of predetermined shapes and sizes.

11. As a new article of manufacture, a medicinal object in the form of a bougie, ball or the like and comprising a protein silver compound, extract of licorice, a hydrotropical substance of the group consisting of para-toluene-sodium-sulfonate and sodium sulfanilate, an inert material easily soluble in water, gum tragacanth and water.

12. As a new article of manufacture, a medicinal object in the form of a bougie, ball or the like and comprising 100 parts by weight of a protein silver compound, 430 parts by weight of the sodium salt of p-toluene sulfonic acid, 284 parts by weight of borax, 16 parts by weight of extract of licorice, 120 parts by weight of gum tragacanth and 50 parts by weight of water.

In testimony whereof, I affix my signature.

OSKAR NEUBERT.